(12) United States Patent
Huang

(10) Patent No.: US 10,386,562 B2
(45) Date of Patent: Aug. 20, 2019

(54) STEREO DISPLAY DEVICE

(71) Applicant: DELTA ELECTRONICS, INC., Taoyuan (TW)

(72) Inventor: June-Jei Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 52 days.

(21) Appl. No.: 15/805,120

(22) Filed: Nov. 6, 2017

(65) Prior Publication Data

US 2018/0306957 A1    Oct. 25, 2018

(30) Foreign Application Priority Data

Apr. 25, 2017   (CN) .......................... 2017 1 0278545

(51) Int. Cl.
| | |
|---|---|
| G02B 27/22 | (2018.01) |
| F21V 8/00 | (2006.01) |
| G02B 3/00 | (2006.01) |
| H04N 13/305 | (2018.01) |
| H04N 13/317 | (2018.01) |

(52) U.S. Cl.
CPC ............. *G02B 6/003* (2013.01); *G02B 3/005* (2013.01); *G02B 6/0088* (2013.01); *G02B 27/2214* (2013.01); *H04N 13/305* (2018.05); *H04N 13/317* (2018.05); *G02B 6/005* (2013.01); *G02B 6/0068* (2013.01)

(58) Field of Classification Search
CPC .............................. G02B 27/26; G02B 27/2214
USPC ........................ 359/463, 443; 348/59; 349/15
See application file for complete search history.

(56) References Cited

U.S. PATENT DOCUMENTS

| | | | |
|---|---|---|---|
| 5,392,140 A * | 2/1995 | Ezra .................... | G02B 27/2214 349/15 |
| 6,710,920 B1 | 3/2004 | Mashitani et al. | |
| 6,859,240 B1 * | 2/2005 | Brown ............... | G02B 27/2214 349/15 |

(Continued)

FOREIGN PATENT DOCUMENTS

| | | |
|---|---|---|
| TW | 201131209 A1 | 9/2011 |
| WO | 2013/187032 A1 | 12/2013 |

OTHER PUBLICATIONS

The pertinent parts of U.S. Pat. No. 6,710,920B1.

*Primary Examiner* — Audrey Y Chang
(74) *Attorney, Agent, or Firm* — CKC & Partners Co., LLC

(57) ABSTRACT

A stereo display device includes a light guide plate, light sources, a display module, and first, second, and third lenticular lens arrays. The light guide plate has incident and exit surfaces. The light sources emit a source light towards the incident surface. The first lenticular lens array transforms the source light into directional lights. The light guide plate receives directional lights at the incident surface and reflects the received directional lights out of the exit surface. The second lenticular lens array transforms the reflected directional lights into focused reflected directional lights towards elongated regions of the display module. The display module transforms focused reflected directional lights into sets of pixel light. The display module's elongated regions extend in a first direction and pixels each includes sub-pixels arranged along the first direction. The third lenticular lens array directs the sets of pixel light to viewing zones.

12 Claims, 11 Drawing Sheets

(56) References Cited

U.S. PATENT DOCUMENTS

| | | | |
|---|---|---|---|
| 8,339,705 B2 * | 12/2012 | Hong | G02B 27/2214 348/59 |
| 8,917,296 B2 | 12/2014 | Ichihashi et al. | |
| 9,646,543 B2 * | 5/2017 | Kang | G02B 27/26 |
| 2011/0001803 A1 | 1/2011 | De Zwart et al. | |
| 2013/0155377 A1 | 6/2013 | Huang et al. | |

* cited by examiner

STEREO DISPLAY DEVICE

RELATED APPLICATIONS

This application claims priority to China Application Serial Number 201710278545.2, filed Apr. 25, 2017, which is herein incorporated by reference.

BACKGROUND

Technical Field

The present disclosure relates to a stereo display device.

Description of Related Art

In the human body, the positions of the left eye and the right eye are different, and the observed images of the left eye and the right eye may have slight differences, which is the fundamental cause of stereopsis. Auto-stereoscopic displays use the vision characteristic of the eyes to generate stereopsis.

The conventional method to generate stereopsis in technology uses a spatial-multiplex method, that is, pixels on the screen are divided into different groups by dispersing of the lens to form a plurality of viewing zones when light emitted from the pixels converges in the viewing distance. The two eyes of a human observer will observe images in different viewing zones, and this will result in the generation of stereopsis.

The application and improvement of the auto-stereoscopic displays has become one of the most important topics.

SUMMARY

An aspect of the disclosure is to provide a stereo display device which can provide a better display effect.

According to an embodiment of the disclosure, a stereo display device is provided which includes a light guide plate, a plurality of light sources, a first lenticular lens array, a display module, a second lenticular lens array, and a third lenticular lens array. The light guide plate has an incident surface and an exit surface. The light guide plate is configured to receive a plurality of directional lights at the incident surface and reflect the directional lights out of the exit surface. The light sources are configured to emit a source light towards the incident surface of the light guide plate. The first lenticular lens array is optically coupled between the light sources and the incident surface of the light guide plate. The first lenticular lens array is configured to transform the source light into the plurality directional lights towards the light guide. The display module is configured to transform a plurality of focused reflected directional lights into a plurality of sets of pixel light. The display module is disposed proximal to the exit surface of the light guide plate and includes a plurality of pixels and a plurality of elongated regions. Each of the pixels includes a plurality of sub-pixels arranged along a first direction. The elongated regions extend in the first direction. The second lenticular lens array is disposed between the exit surface of the light guide plate and the display module. The second lenticular lens array is configured to transform the reflected directional lights into the focused reflected directional lights towards the elongated regions of the display module. The third lenticular lens array is disposed at a side of the display module distal to the light guide plate. The third lenticular lens array is configured to direct the sets of pixel light to a plurality of viewing zones.

BRIEF DESCRIPTION OF THE DRAWINGS

FIG. 9 is a schematic diagram illustrating viewing zones corresponding to a kind of sub-pixel in the stereo display device adopting the optical configurations shown in FIG. 8.

DETAILED DESCRIPTION

Figure 1:
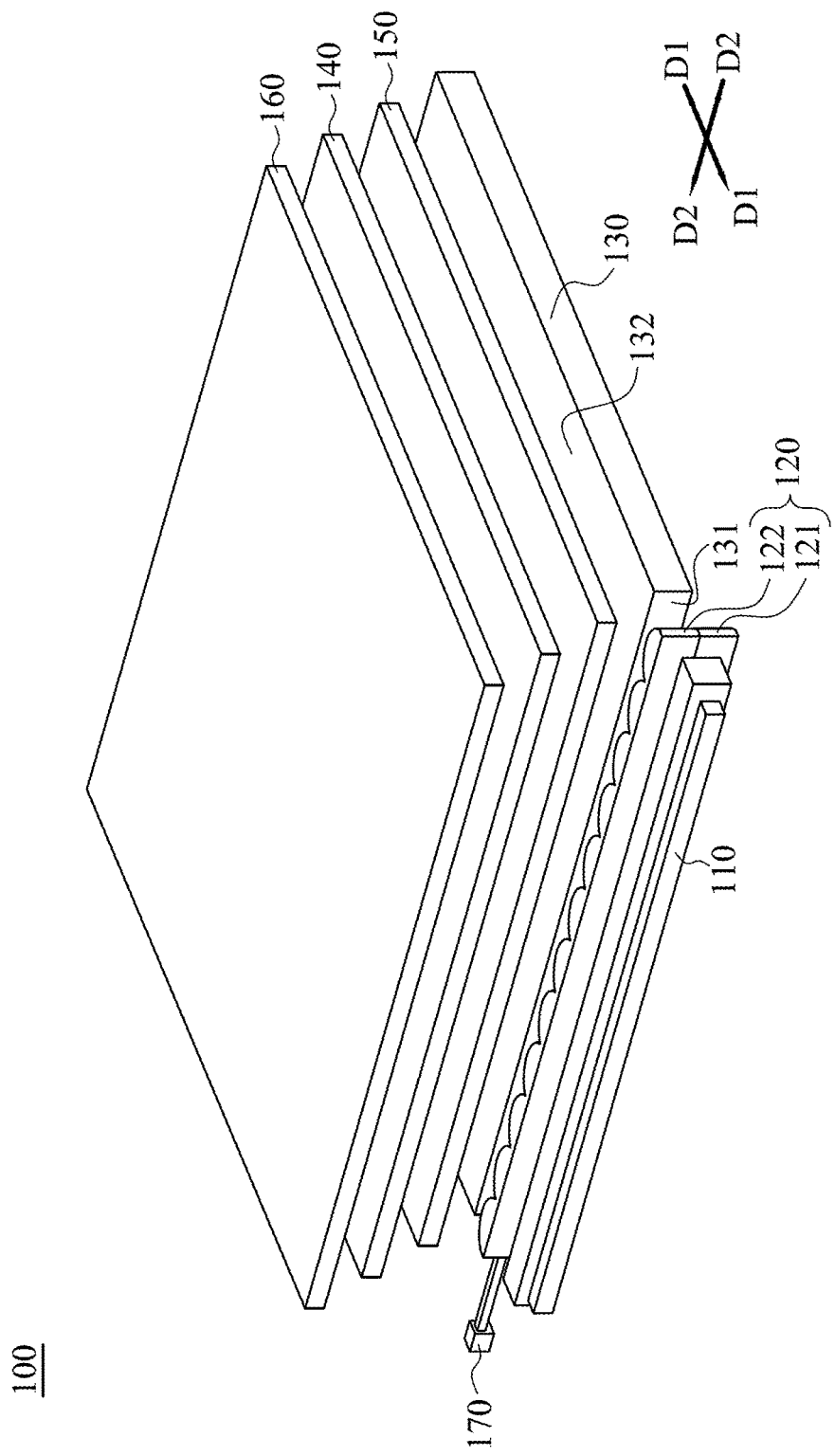
FIG. 1 is a perspective view of a stereo display device according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

Figure 2A:
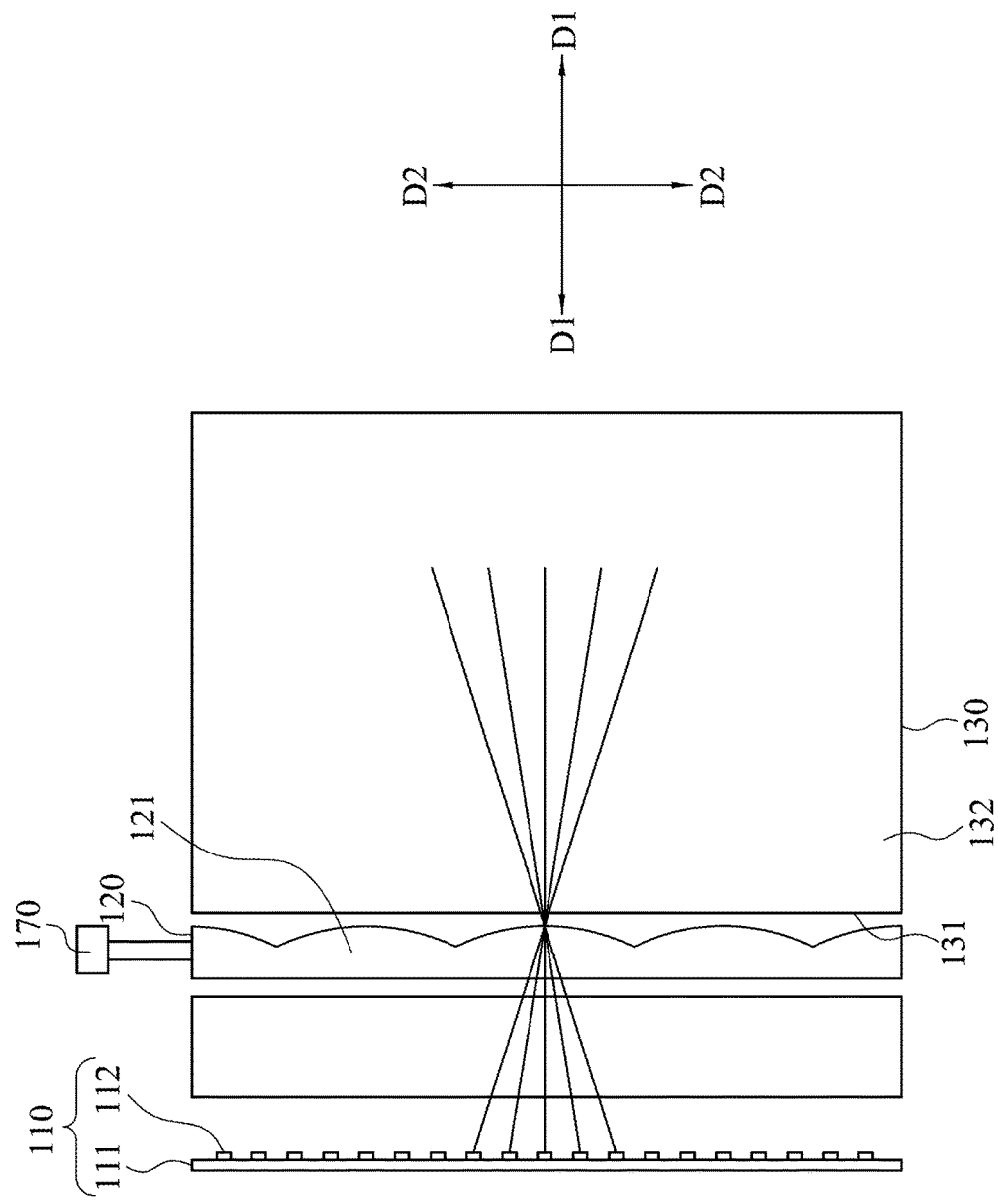
FIG. 2A is a top view of a light emitting module, a first lenticular lens array, and a light guide plate shown in FIG. 1.
Figure 2B:
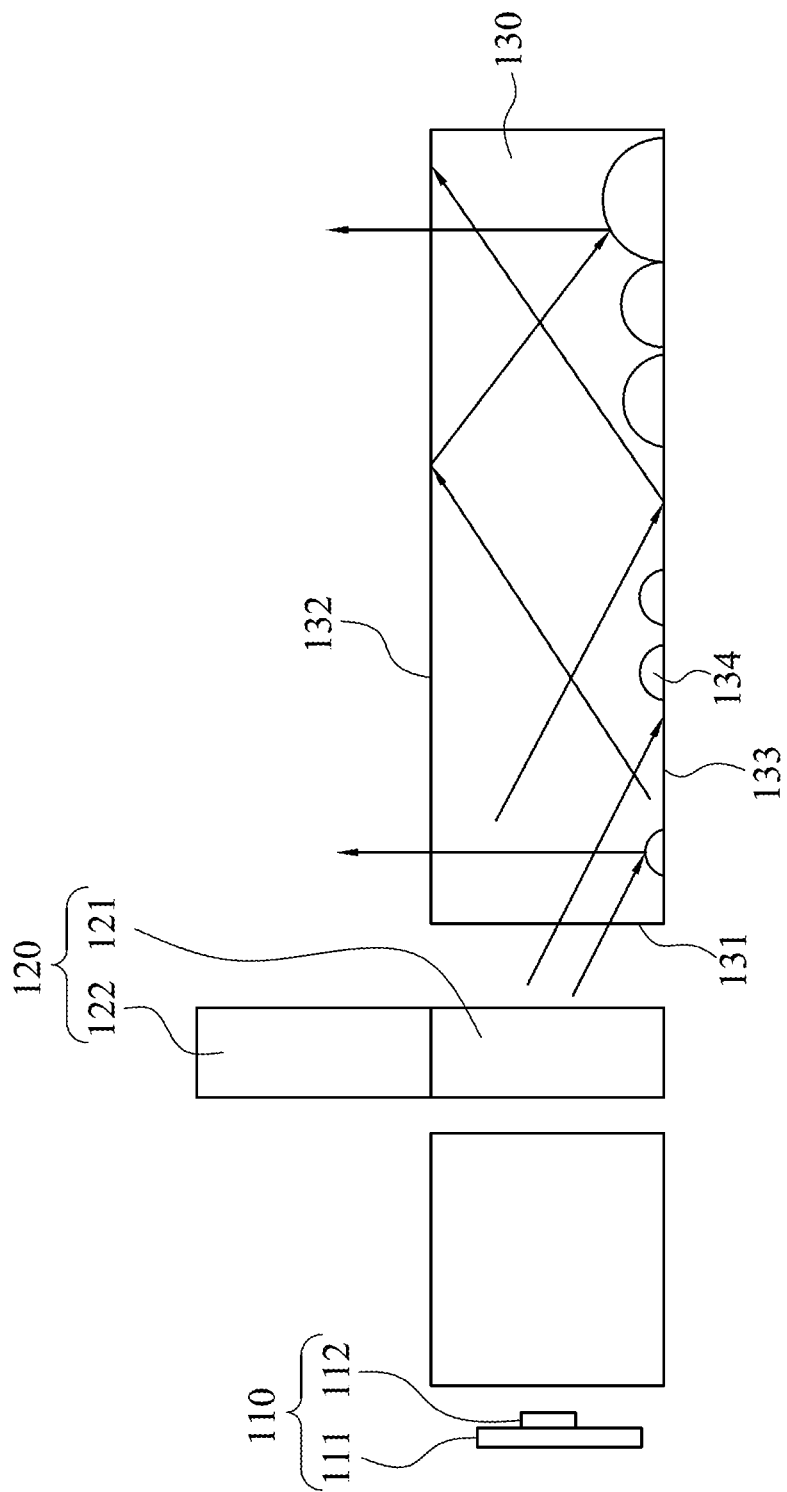
FIG. 2B is a side cross-sectional view of the components shown in FIG. 2A.

Reference is made to FIGS. 1, 2A, and 2B. As shown, the stereo display device 100 includes a light guide plate 130, a light emitting module 110, a first lenticular lens array 120, a display module 140, a second lenticular lens array 150, and a third lenticular lens array 160. In the embodiment shown, the light guide plate 130 has an incident surface 131, an exit surface 132, and a bottom surface 133. The incident surface 131 and the exit surface 132 are respectively located at adjacent sides of the light guide plate 130. The exit surface 132 and the bottom surface 133 are respectively located at opposite sides of the light guide plate 130. The light emitting module 110 includes a circuit board 111 and a plurality of light sources 112. The light sources 112 are disposed on the circuit board 111 and configured to emit a source light towards the incident surface 131 of the light guide plate 130. The first lenticular lens array 120 is optically coupled between the light sources 112 and the incident surface 131 of the light guide plate 130 and configured to transform the source light emitted by the light sources 112 into a plurality of directional lights. In other words, the first lenticular lens array 120 has an optical power in a first direction D1 to transform the source light emitted by the light sources 112 into the directional lights in several directions (as shown in FIG. 2A). To transform the source light emitted by the light sources 112 into the directional lights, the light sources 112 are located on a focal plane of the first lenticular lens array 120. The light guide plate 130 includes at least one microstructure 134 disposed on the bottom surface 133. The microstructure 134 is configured to reflect the directional lights entering the light guide plate 130 towards the exit surface 132. Hence, the light guide plate 130 can reflect the received directional lights out of the exit surface 132.

In some embodiments, the microstructure 134 can be a reflector. For example, the microstructure 134 can be comprised of reflective materials, such as silver, aluminum, copper, and etc. Alternatively, in other embodiments, the microstructure 134 can be a micro prismatic groove formed on the bottom surface 133 of the light guide plate 130. A reflective layer can be disposed on the inner surface of the micro prismatic groove, and the rest of the space in the micro prismatic groove can be filled with appropriate filling materials.

Figure 3:
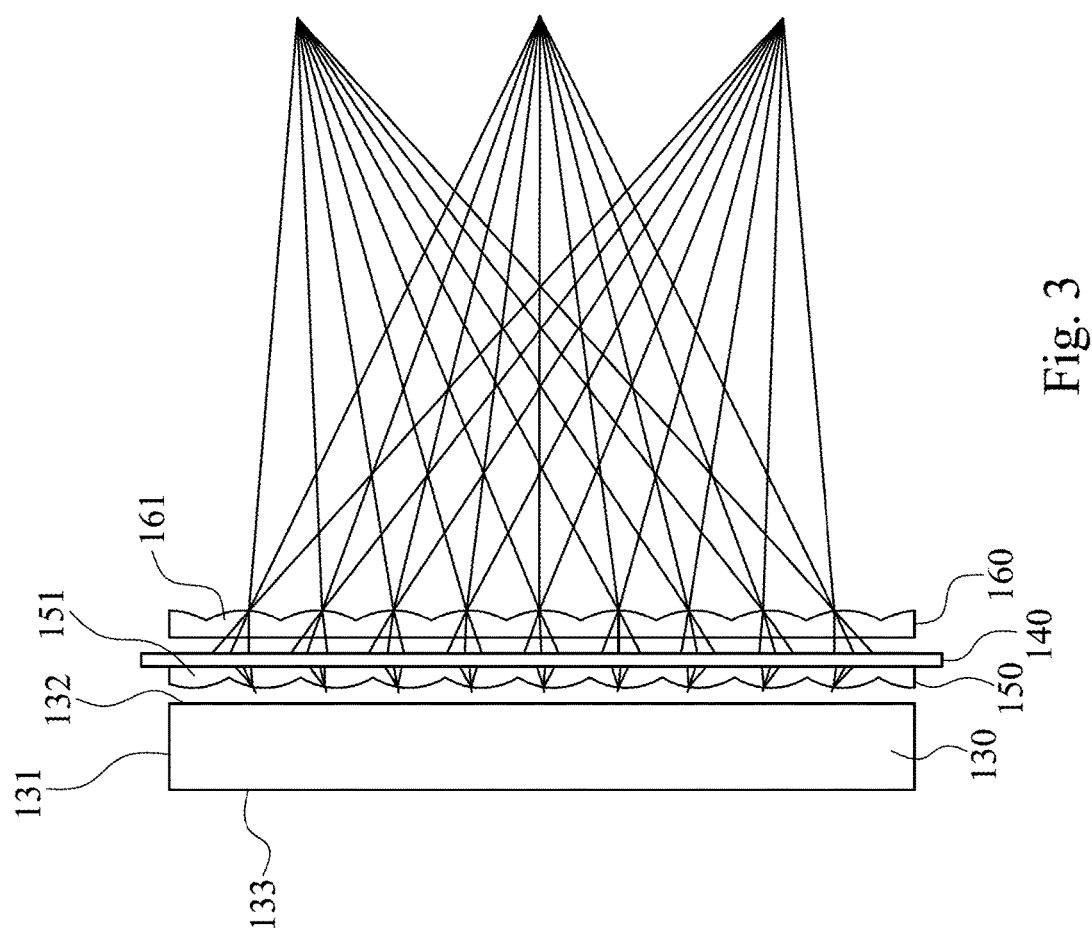
FIG. 3 is a side view of the light guide plate, a second lenticular lens array, a display module, and a third lenticular lens array shown in FIG. 1.
Figure 4:
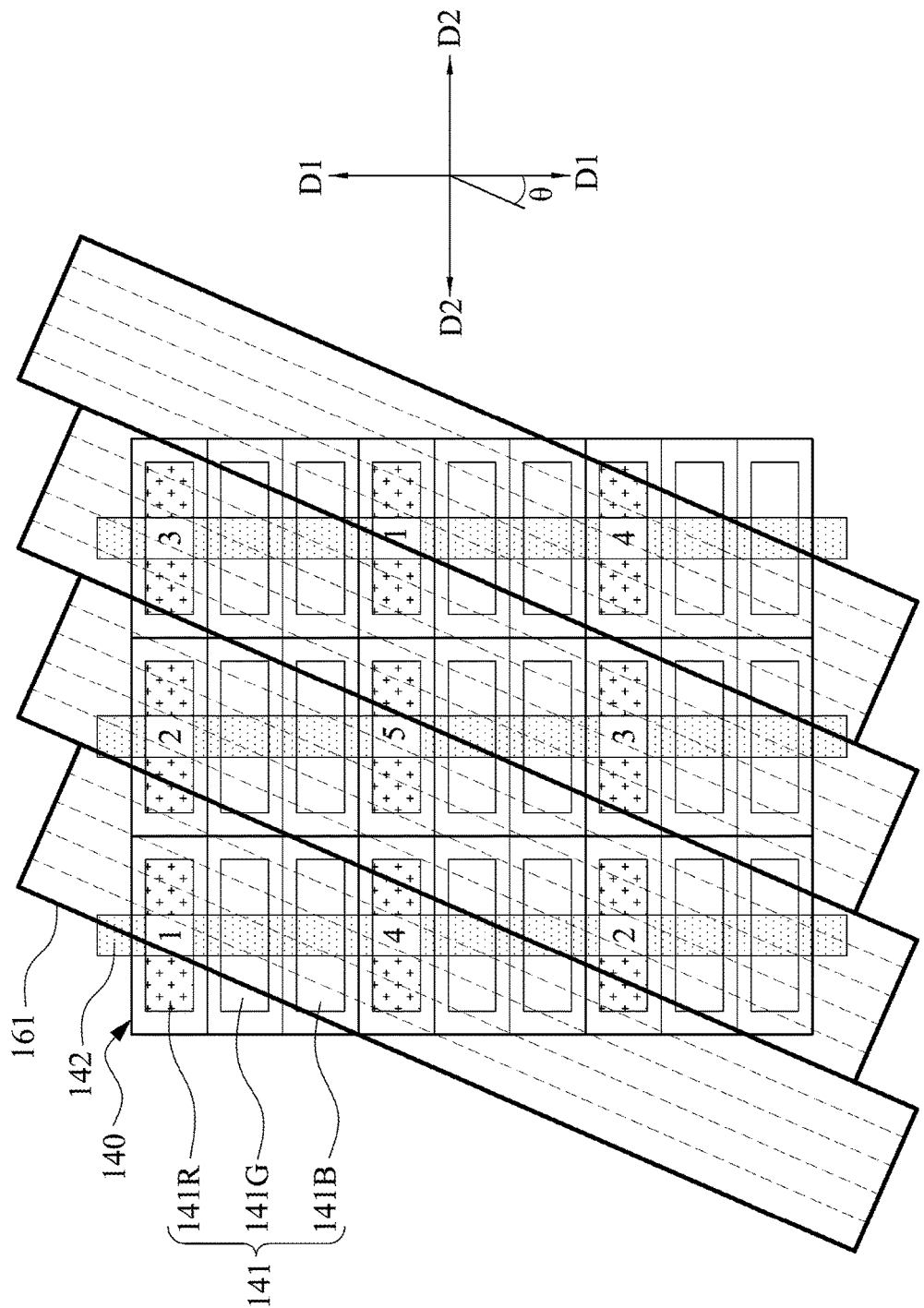
FIG. 4 is a partial plan view of the display module and the third lenticular lens array according to an embodiment of the disclosure.

Reference is made to FIGS. 3 and 4. As shown in the embodiment, the display module 140 is disposed proximal to the exit surface 132 of the light guide plate 130 and includes a plurality of pixels 141. The pixels 141 are arranged along the first direction D1 and a second direction D2 perpendicular to the first direction D1 to form a pixel array, and each of the pixels 141 includes a plurality of sub-pixels 141R, 141G, and 141B arranged along the first direction D1.

It should be pointed out that while using a conventional display device, sub-pixels of each pixel are arranged along the horizontal direction. On the contrary, while using the stereo display device 100 of the present embodiment, the orientation of the stereo display device 100 can be adjusted to make the first direction D1 extend along the vertical direction and make the second direction D2 extend along the horizontal direction. That is, in the stereo display device 100 of the present embodiment, the sub-pixels 141R, 141G, and 141B of each pixel 141 are arranged in the vertical direction.

The second lenticular lens array 150 is disposed between the exit surface 132 of the light guide plate 130 and the display module 140 and configured to focus the reflected directional lights (i.e., the directional lights leaving from the exit surface 132) at a plurality of elongated regions 142 on the display module 140. Each of the elongated regions 142 extends the first direction D1. The display module 140 is configured to transform the focused directional lights into a plurality sets of pixel light. In other words, the second lenticular lens array 150 has an optical power in the second direction D2 to focus the reflected directional lights at the elongated regions 142 arranged along the second direction D2. To focus the reflected directional lights at the elongated regions 142, the display module 140 is located on a focal plane of the second lenticular lens array 150, and the second lenticular lens array 150 has a plurality of second lenticular lenses 151 extending along the first direction D1.

Furthermore, the pixels 141 are arranged along the second direction D2 perpendicular to the first direction D1 to form a plurality of pixel rows (i.e., vertical rows shown in FIG. 4). The elongated regions 142 respectively extend across the pixel rows. Therefore, the sub-pixels 141R, 141G, and 141B of each pixel 141 are passed through by a part of the directional lights.

The third lenticular lens array 160 is disposed at a side of the display module 140 distal to the light guide plate 130 and configured to respectively direct the sets of pixel light to a plurality of viewing zones. To respectively direct the sets of pixel light to the viewing zones, the display module 140 is located on a focal plane of the third lenticular lens array 160, and the third lenticular lens array 160 has a plurality of third lenticular lenses 161 extending in a direction which is at a gradient angle θ relative to the first direction D1, for example as shown in FIG. 4. In an example of which the stereo display device 100 of the present embodiment comprises the sub-pixels 141R, 141G, and 141B of each pixel 141 arranged in the vertical direction, the third lenticular lens array 160 can respectively direct the sets of pixel light to the viewing zones in the horizontal direction.

In some embodiments, the third lenticular lenses 161 extend with an incline having the gradient angle θ relative to the first direction D1. The configuration is characterized by the following equation:

$$\theta = \tan^{-1}(1/N),$$

in which θ is the gradient angle and N is a natural number greater than 1.

In some embodiments, N can be 2, 3, 4, 5, 6, 7, or 8, but the disclosure is not limited in this regard.

For example, as shown in FIGS. 2 and 4, in the present embodiment, for a stereo display device 100 providing five viewing zones, each of the first lenticular sub-lenses 121 of the first lenticular lens array 120 can be configured to correspond to five light sources 112 in the first direction D1 (see FIG. 2A). Therefore, each of the first lenticular sub-lenses 121 can transform the source light of five light sources 112 into five directional lights.

Furthermore, a width in the second direction D2 of each of the elongated regions 142 can be designed to be smaller than or equal to a width in the second direction D2 of each of the pixels 141. For example, as shown in FIG. 4, a width in the second direction D2 of an overlapping area of each of the elongated regions 142 and the corresponding sub-pixel 141R occupies ⅙ times of a width in the second direction D2 of each of the pixels 141, and the overlapping area in the first direction D1 of each of the elongated regions 142 and the corresponding sub-pixel 141R occupies ⅓ times of a width in the first direction D1 of each of the pixels 141 (because each pixel 141 is divided into three parts). Hence, in the present embodiment, the gradient angle θ can be calculated from the widths respectively in the first direction D1 and the second direction D2 of the overlapping area of each of the elongated regions 142 and the corresponding sub-pixel 141R. Specifically, according to the aforementioned equation (i.e., $\theta = \tan^{-1}(1/N)$), $N = (⅓) \div (⅙)$, so the gradient angle θ can be calculated to be $\tan^{-1}(½)$. In other words, a width in the second direction D2 of each of the elongated regions 142 is equal to $1/(3N)$ times of a width in the second direction D2 of each of the pixels 141.

Each of the third lenticular lenses 161 can be virtually divided into five elongate parts, with each part extending in the same direction as the third lenticular lenses 161. The five parts can respectively direct the pixel lights transformed by the display module 140 to five viewing zones, and the adjacent one of the third lenticular lenses 161 repeats the five viewing zones.

Furthermore, a width in the second direction D2 of each of the third lenticular lenses 161 can be designed to be equal to ⅚ times of a width in the second direction D2 of each of the pixels 141 (see FIG. 4). Under this structural configuration, the pixel light of the sub-pixel 141R of the pixel 141 located at the upper left corner can be directed to a first viewing zone (labeled as 1) by the corresponding third lenticular lens 161, and the pixel lights of the sub-pixels 141R of the adjacent right pixel 141 and the adjacent below pixel 141 can be respectively directed to a second viewing zone (labeled as 2) and a fourth viewing zone (labeled as 4) by the corresponding third lenticular lenses 161. The viewing zones respectively correspond by the pixel lights of the sub-pixels 141R of the other six pixels 141 in FIG. 4 are not further discussed here and can be directly referred to the labeled numbers in FIG. 4.

Figure 5:
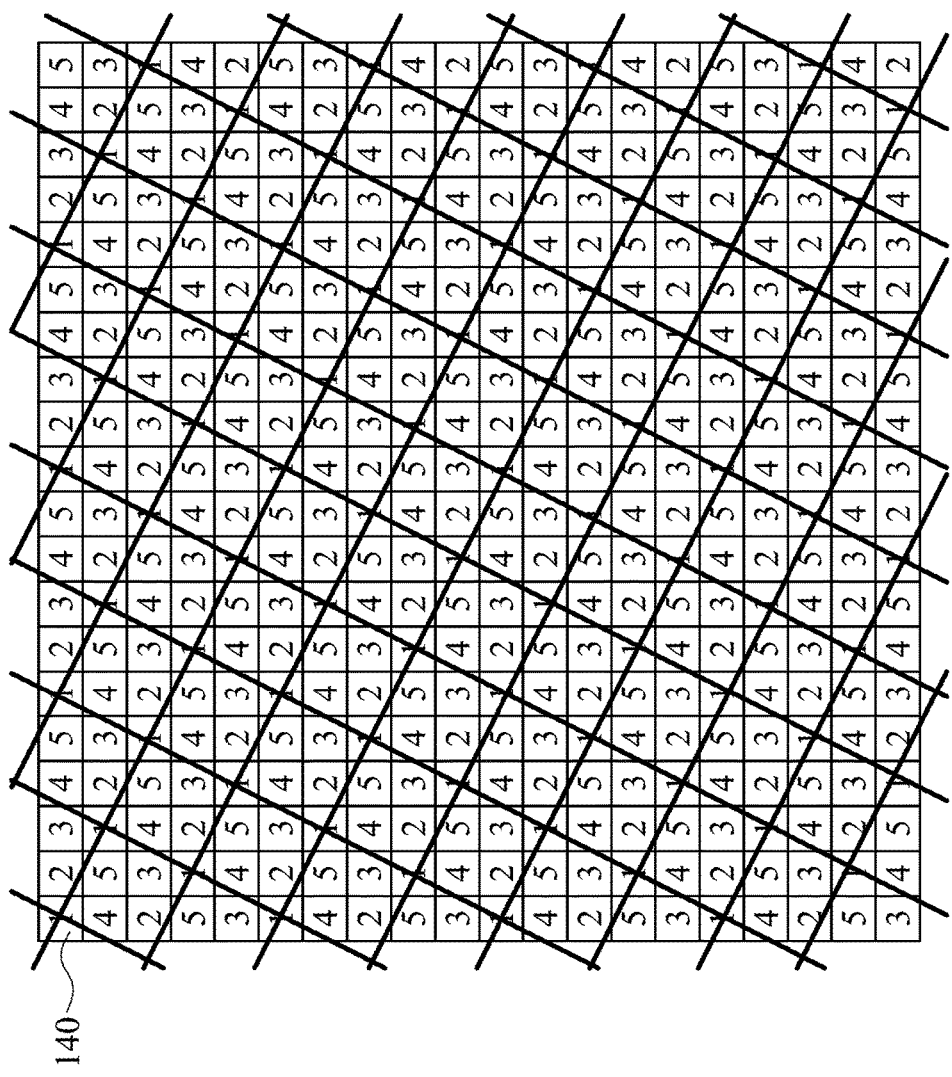
FIG. 5 is a schematic diagram illustrating viewing zones corresponding to a kind of sub-pixel in the stereo display device adopting the optical configurations shown in FIG. 4.

Reference is made to FIG. 5. As shown, the pixel lights of a kind of sub-pixel (e.g., the sub-pixel 141R shown in FIG. 4) of the pixels 141 located at the intersection points of all gradient lines correspond to the first viewing zone (directed by the third lenticular lenses 161). That is, an observer in the first viewing zone can see the pixel lights of this kind of sub-pixel of the pixels 141 at the intersection points of the gradient lines. Observers in the other four viewing zones can see the pixel lights of this kind of sub-pixel at the other pixels 141 based on the same principles and therefore are not repeated here to avoid duplicity.

Figure 6:
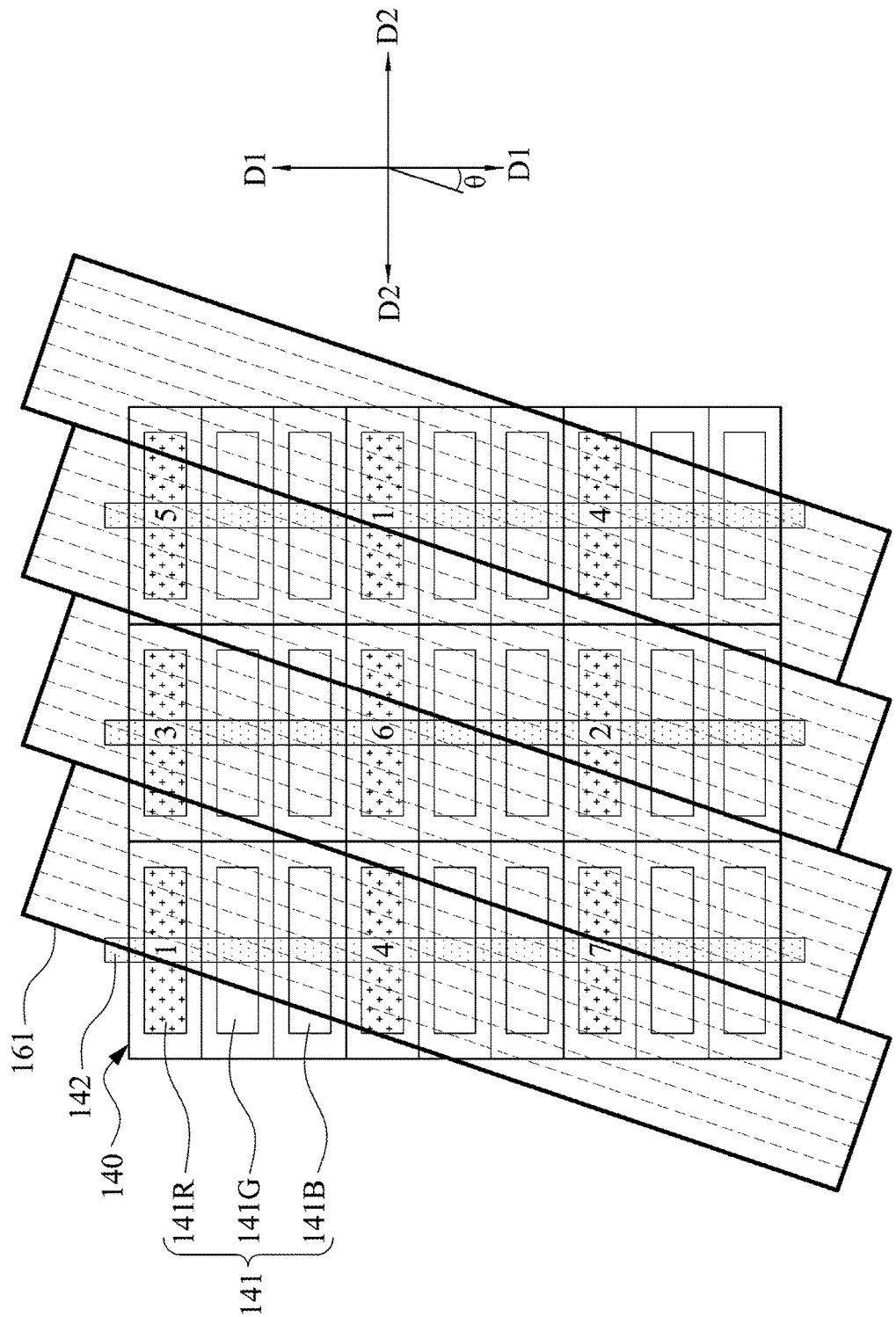
FIG. 6 is a partial plan view of the display module and the third lenticular lens array according to another embodiment of the disclosure.

Reference is made to FIG. 6 showing an alternative embodiment. As shown, the stereo display device 100 provides seven viewing zones, and each of the first lenticular sub-lenses 121 of the first lenticular lens array 120 can be configured to correspond to seven light sources 112 in the first direction D1. Therefore, each of the first lenticular sub-lenses 121 can transform source light of the seven light sources 112 into seven directional lights.

As shown in FIG. 6, a width in the second direction D2 of an overlapping area of each of the elongated regions 142 and the corresponding sub-pixel 141R occupies ⅑ times of a width in the second direction D2 of each of the pixels 141, and the overlapping area in the first direction D1 of each of the elongated regions 142 and the corresponding sub-pixel 141R occupies ⅓ times of a width in the first direction D1 of each of the pixels 141 (because each pixel 141 is divided into three parts). Hence, in the present embodiment, the gradient angle θ can be calculated from the widths respectively in the first direction D1 and the second direction D2 of the overlapping area of each of the elongated regions 142 and the corresponding sub-pixel 141R. Specifically, according to the aforementioned equation (i.e., $\theta=\tan^{-1}(1/N)$), $N=(⅓)÷(⅑)$, so the gradient angle θ can be calculated to be $\tan^{-1}(⅓)$.

Each of the third lenticular lenses 161 can be virtually divided into seven elongate parts, with each part extending in the same direction as the third lenticular lenses 161. The seven parts can respectively direct the pixel lights transformed by the display module 140 to seven viewing zones, and the adjacent one of the third lenticular lenses 161 repeats the seven viewing zones.

Furthermore, a width in the second direction D2 of each of the third lenticular lenses 161 can be designed to be equal to ⅞ times of a width in the second direction D2 of each of the pixels 141 (see FIG. 6). Under this structural configuration, the pixel light of the sub-pixel 141R of the pixel 141 located at the upper left corner can be directed to a first viewing zone (labeled as 1) by the corresponding third lenticular lens 161, and the pixel lights of the sub-pixels 141R of the adjacent right pixel 141 and the adjacent below pixel 141 can be respectively directed to a third viewing zone (labeled as 3) and a fourth viewing zone (labeled as 4) by the corresponding third lenticular lenses 161. The viewing zones respectively correspond by the pixel lights of the sub-pixels 141R of the other six pixels 141 in FIG. 6 are not further discussed here and can be directly referred to the labeled numbers in FIG. 6.

Figure 7:
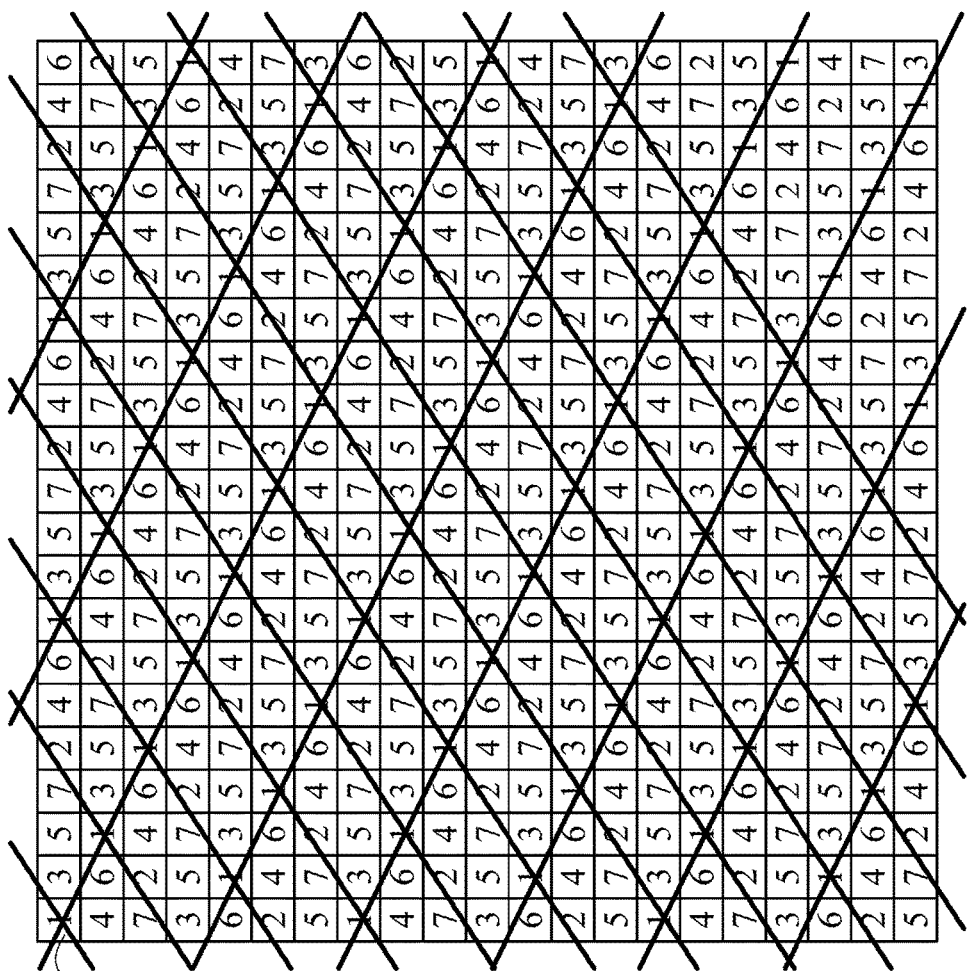
FIG. 7 is a schematic diagram illustrating viewing zones corresponding to a kind of sub-pixel in the stereo display device adopting the optical configurations shown in FIG. 6.

Reference is made to FIG. 7. As shown, the pixel lights of a kind of sub-pixel (e.g., the sub-pixel 141R shown in FIG. 6) of the pixels 141 located at the intersection points of all gradient lines correspond to the first viewing zone (directed by the third lenticular lenses 161). That is, an observer in the first viewing zone can see the pixel lights of this kind of sub-pixel of the pixels 141 at the intersection points of the gradient lines. Observers in the other six viewing zones can see the pixel lights of this kind of sub-pixel at the other pixels 141 based on the same principles and therefore are not repeated here to avoid duplicity.

Figure 8:
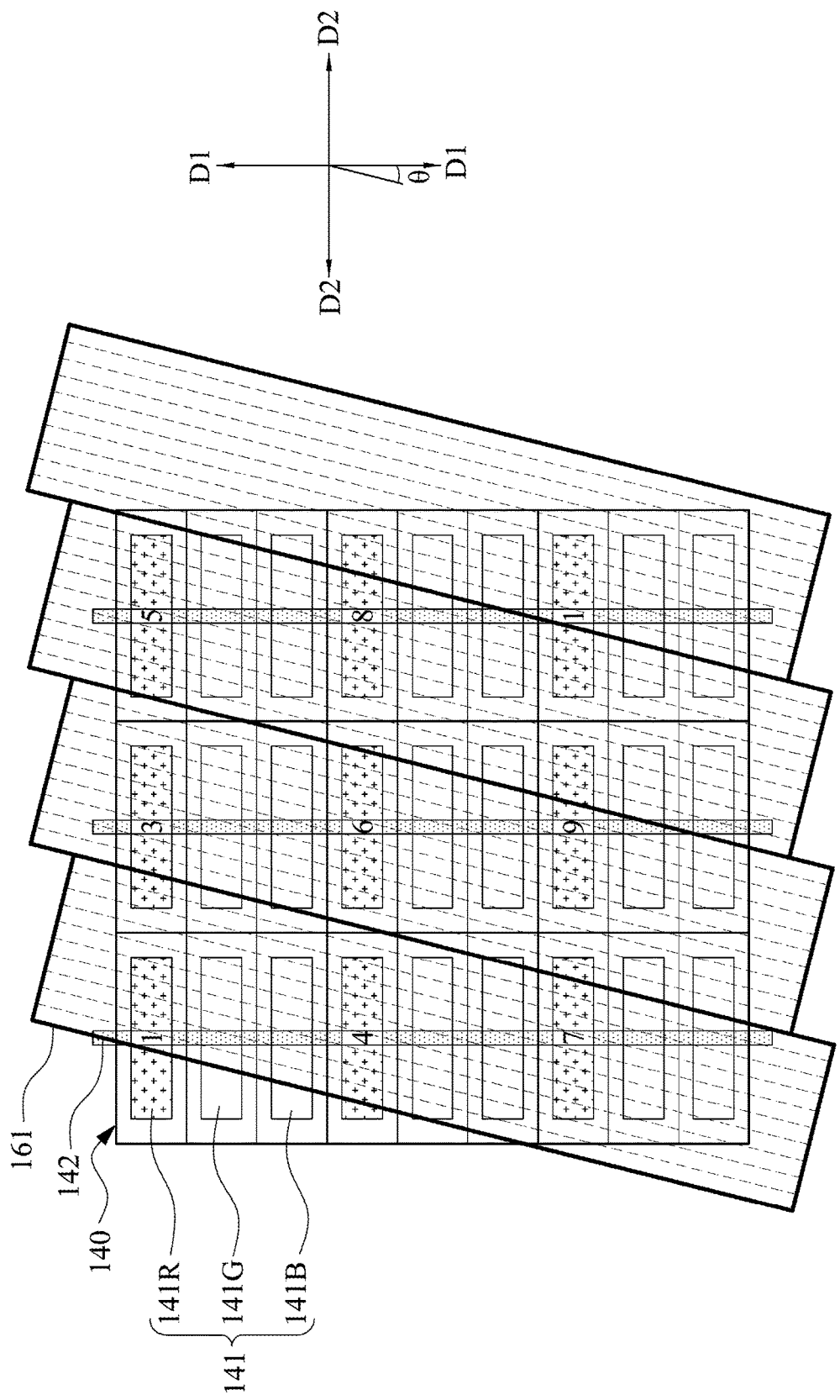
FIG. 8 is a partial plan view of the display module and the third lenticular lens array according to another embodiment of the disclosure.

Reference is made to FIG. 8 showing an alternative embodiment. As shown, the stereo display device 100 provides ten viewing zones, and each of the first lenticular sub-lenses 121 of the first lenticular lens array 120 can be configured to correspond to ten light sources 112 in the first direction D1. Therefore, each of the first lenticular sub-lenses 121 can transform source light of the ten light sources 112 into ten directional lights.

As shown in FIG. 8, a width in the second direction D2 of an overlapping area of each of the elongated regions 142 and the corresponding sub-pixel 141R occupies 1/12 times of a width in the second direction D2 of each of the pixels 141, and the overlapping area in the first direction D1 of each of the elongated regions 142 and the corresponding sub-pixel 141R occupies ⅓ times of a width in the first direction D1 of each of the pixels 141 (because each pixel 141 is divided into three parts). Hence, in the present embodiment, the gradient angle θ can be calculated from the widths of the overlapping area respectively in the first direction D1 and the second directions of each of the elongated regions 142 and the corresponding sub-pixel 141R. Specifically, according to the aforementioned equation (i.e., $\theta=\tan^{-1}(1/N)$), $N=(⅓)÷(1/12)$, so the gradient angle θ can be calculated to be $\tan^{-1}(¼)$.

Each of the third lenticular lenses 161 can be virtually divided into ten elongate parts, with each part extending in the same direction as the third lenticular lenses 161. The ten parts can respectively direct the pixel lights transformed by the display module 140 to ten viewing zones, and the adjacent one of the third lenticular lenses 161 repeats the ten viewing zones.

Furthermore, a width in the second direction D2 of each of the third lenticular lenses 161 can be designed to be equal to 10/12 times of a width in the second direction D2 of each of the pixels 141 (see FIG. 8). Under this structural configuration, the pixel light of the sub-pixel 141R of the pixel 141 located at the upper left corner can be directed to a first viewing zone (labeled as 1) by the corresponding third lenticular lens 161, and the pixel lights of the sub-pixels 141R of the adjacent right pixel 141 and the adjacent below pixel 141 can be respectively directed to a third viewing zone (labeled as 3) and a fourth viewing zone (labeled as 4) by the corresponding third lenticular lenses 161. The viewing zones respectively correspond by the pixel lights of the sub-pixels 141R of the other six pixels 141 in FIG. 8 are not further discussed here and can be directly referred to the labeled numbers in FIG. 8.

Figure 9:
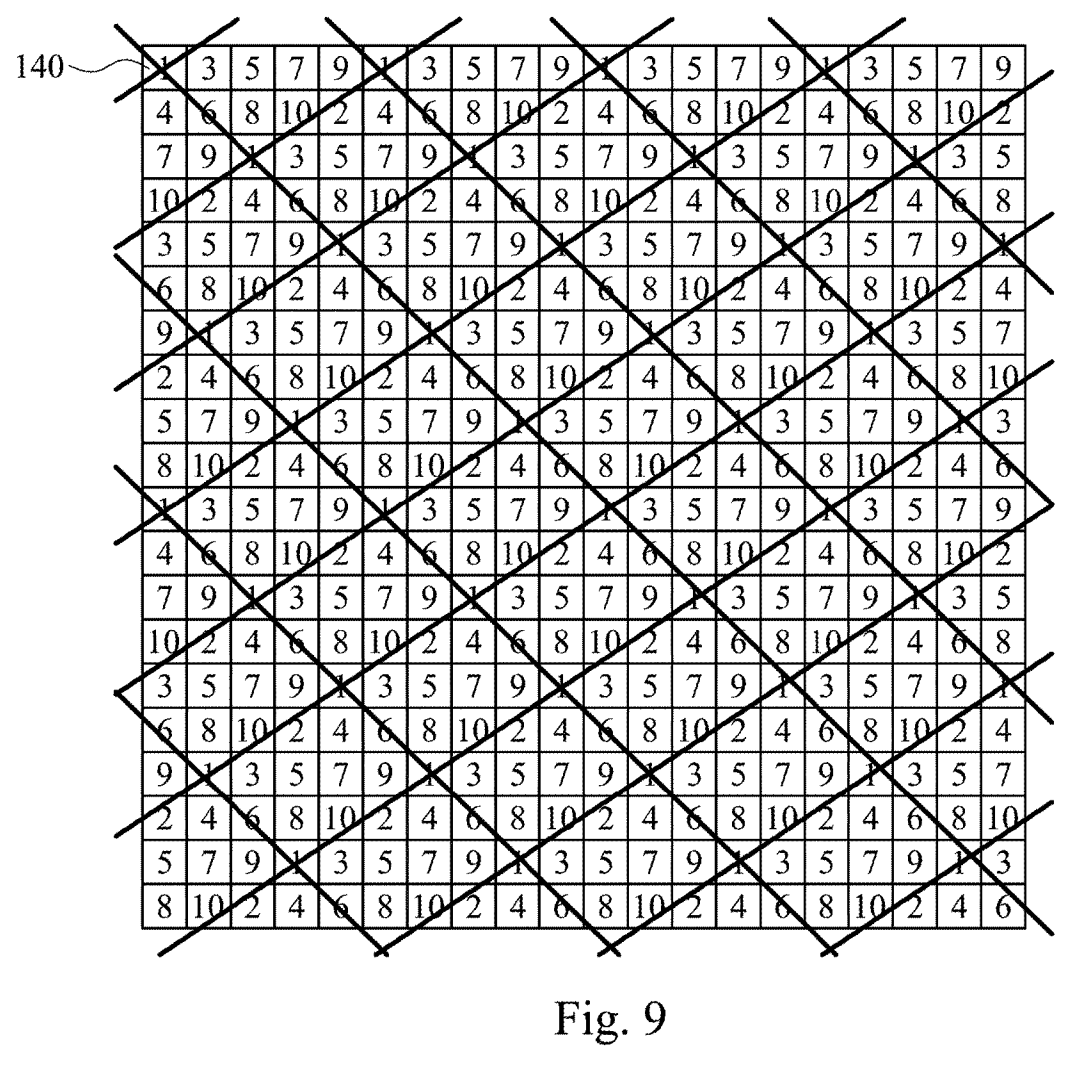

Reference is made to FIG. 9. As shown, the pixel lights of a kind of sub-pixel (e.g., the sub-pixel 141R shown in FIG. 8) of the pixels 141 located at the intersection points of all gradient lines correspond to the first viewing zone (directed by the third lenticular lenses 161). That is, an observer in the first viewing zone can see the pixel lights of this kind of sub-pixel of the pixels 141 at the intersection points of the gradient lines. Observers in the other nine viewing zones can see the pixel lights of this kind of sub-pixel at the other pixels 141 based on the same principles and therefore are not repeated here to avoid duplicity.

Figure 10:
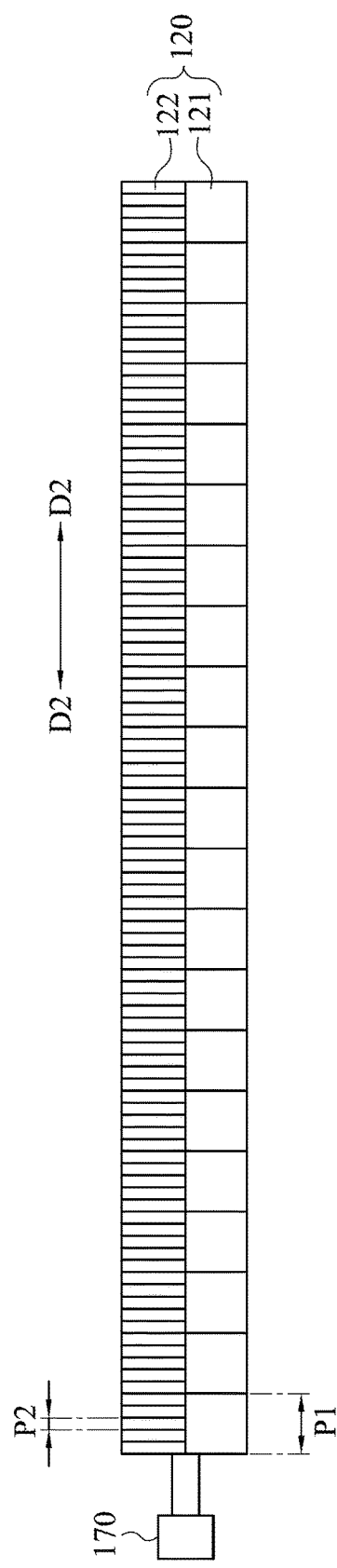
FIG. 10 is a front view of the first lenticular lens array and a movement module according to an embodiment of the disclosure.

It should be noted that in the stereo display device 100 adopting the optical configurations shown in FIG. 4, the resolution of each viewing zone may be reduced to ⅕ times. Reference is made to FIG. 10 together with FIG. 1-2B. In the embodiment shown, each of the first lenticular sub-lenses 121 has a first pitch P1 in the second direction D2. The first lenticular sub-lenses 121 are arranged along the second direction D2 and each extending perpendicular to the first direction D1 and the second direction D2. The first lenticular lens array 120 further has a plurality of second lenticular sub-lenses 122 arranged along the second direction D2 and each extending perpendicular to the first direction D1 and the second direction D2. Each of the second lenticular sub-lenses 122 has a second pitch P2 in the second direction D2. Considering the above-mentioned problem of reduced resolution (for example, reduced to ⅕ times), the first pitch P1 is designed to be 5 times the second pitch P2 in this embodiment. Hence, when the second lenticular sub-lenses 122 are optically coupled between the light sources 112 and the incident surface 131, each of the second lenticular sub-lenses 122 corresponds to one of the light sources 112 in the first direction D1. The lights passing through the second lenticular sub-lenses 122 would not be directed to several viewing zones, and the stereo display device 100 can restore to its original resolution.

As shown in the Figs, the stereo display device 100 further includes a movement module 170. The movement module 170 is configured to move the first lenticular lens array 120 and selectively make the first lenticular sub-lenses 121 or the second lenticular sub-lenses 122 optically coupled between the light sources 112 and the incident surface 131. Therefore, the stereo display device 100 can move the first lenticular lens array 120 by the movement module 170, and make the first lenticular sub-lenses 121 optically coupled to light sources 112 and the incident surface 131 for use in 3D mode. The stereo display device 100 can also move the first lenticular lens array 120 by the movement module 170, and make the second lenticular sub-lenses 122 optically coupled to light sources 112 and the incident surface 131 for use in 2D mode.

It should similarly be noted that, in the stereo display device 100 adopting the optical configurations shown in FIG. 6, the resolution of each viewing zone may be reduced to ⅐ times. Considering the aforementioned problem of reduction of the resolution, the second pitch P2 of the second lenticular sub-lenses 122 can be designed to be ⅐ times of the first pitch P1 of the first lenticular sub-lenses 121. Similarly, in the stereo display device 100 adopting the optical configurations shown in FIG. 8, considering the problem of reduction of the resolution, the second pitch P2 of the second lenticular sub-lenses 122 can be designed to be ¹⁄₁₀ times of the first pitch P1 of the first lenticular sub-lenses 121.

According to the foregoing recitations of the embodiments of the disclosure, it can be understood that whilst using the stereo display device of the present disclosure, the orientation of the stereo display device can be adjusted to make sub-pixels of each pixel to be arranged in the vertical direction. Through use of orientation, the stereo display device of the present disclosure can respectively direct a plurality of sets of pixel light to a plurality of viewing zones in the horizontal direction by using a first lenticular lens array, a second lenticular lens array, and a third lenticular lens array. Further, embodiments have been described wherein the first lenticular lens array includes a plurality of first lenticular sub-lenses having a larger pitch and a plurality of second lenticular sub-lenses having a smaller pitch. The present disclosure provides for selectively making the first lenticular sub-lenses optically coupled to light sources for use in 3D mode, or make the second lenticular sub-lenses optically coupled to light sources for use in 2D mode, and the resolution can be restored in 2D mode.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A stereo display device, comprising:
    a light guide plate having an incident surface and an exit surface, the light guide plate being configured to receive a plurality of directional lights at the incident surface and reflect the directional lights out of the exit surface;
    a plurality of light sources configured to emit a source light towards the incident surface of the light guide plate;
    a first lenticular lens array optically coupled between the light sources and the incident surface of the light guide plate, the first lenticular lens array being configured to transform the source light into the plurality of directional lights;
    a display module configured to transform a plurality of focused reflected directional lights into a plurality of sets of pixel light, the display module being disposed proximal to the exit surface of the light guide plate and comprising a plurality of pixels and a plurality of elongated regions, wherein each of the pixels comprises a plurality of sub-pixels arranged along a first direction and wherein the elongated regions extend in the first direction;
    a second lenticular lens array disposed between the exit surface of the light guide plate and the display module, the second lenticular lens array being configured to transform the reflected directional lights into the focused reflected directional lights towards the elongated regions of the display module; and
    a third lenticular lens array disposed at a side of the display module distal to the light guide plate, the third lenticular lens array being configured to direct the sets of pixel light to a plurality of viewing zones,
    wherein the first lenticular lens array comprises a plurality of first lenticular sub-lenses and a plurality of second lenticular sub-lenses, the plurality of first lenticular sub-lenses and the plurality of second lenticular sub-lenses are arranged along a second direction perpendicular to the first direction,
    wherein each of the first lenticular sub-lenses extends perpendicular to the first and second directions, and each of the second lenticular sub-lenses extends perpendicular to the first and second directions,
    wherein each of the first lenticular sub-lenses has a first pitch in the second direction and each of the second lenticular sub-lenses has a second pitch in the second direction, and wherein the first pitch is configured to be a multiple of the second pitch.

2. The stereo display device of claim 1, wherein the pixels are arranged along the second direction to form a plurality of pixel rows, and wherein the elongated regions respectively extend across the pixel rows.

3. The stereo display device of claim 1, wherein each first lenticular sub-lens corresponds to a number of corresponding light sources in the first direction, and wherein the number of corresponding light sources is greater than 1 and less than a total number of the light sources.

4. The stereo display device of claim 1, further comprising:
a movement module configured to move the first lenticular lens array to selectively make the first lenticular sub-lenses or the second lenticular sub-lenses to be optically coupled between the light sources and the incident surface of the light guide plate.

5. The stereo display device of claim 1, wherein the second lenticular lens array comprises a plurality of second lenticular lenses extending in the first direction.

6. The stereo display device of claim 1, wherein the third lenticular lens array comprises a plurality of third lenticular lenses extending at a gradient angle relative to the first direction.

7. The stereo display device of claim 6, wherein the pixels are arranged along the first direction and the second direction to form a pixel array, and wherein a width in the second direction of each of the third lenticular lenses is smaller than a width in the second direction of each of the pixels.

8. The stereo display device of claim 6, wherein the third lenticular lenses extends with an incline having the gradient angle relative to the first direction, and the configuration is characterized by the following equation:

$\theta = \tan^{-1}(1/N)$, wherein $\theta$ is the gradient angle and N is a natural number greater than 1.

9. The stereo display device of claim 8, wherein N is 2, 3, 4, 5, 6, 7, or 8.

10. The stereo display device of claim 8, wherein the pixels are arranged along the first direction and the second direction, and a width in the second direction of each of the elongated regions is smaller than or equal to 1/(3N) times of a width in the second direction of each of the pixels.

11. The stereo display device of claim 1, wherein the light sources are located on a focal plane of the first lenticular lens array.

12. The stereo display device of claim 1, wherein the display module is located on a focal plane of the second lenticular lens array and a focal plane of the third lenticular lens array.

* * * * *